May 2, 1967 L. O. MESENHIMER 3,317,812
VOLTAGE REGULATOR CIRCUIT
Filed Aug. 3, 1962 2 Sheets-Sheet 1

INVENTOR.
LEE O. MESENHIMER
BY
ATTY.

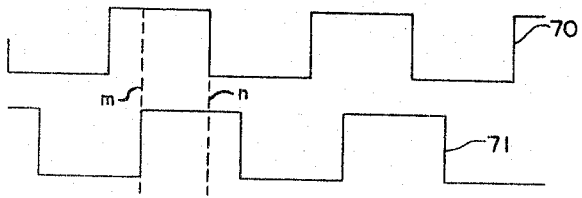
FIG. 2
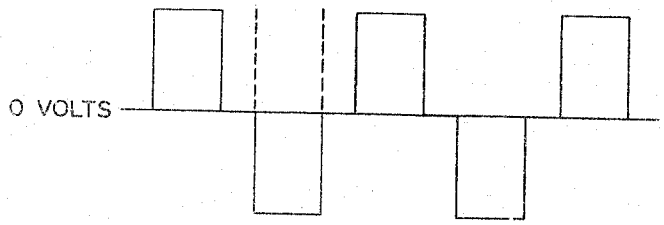
FIG. 3  0 VOLTS
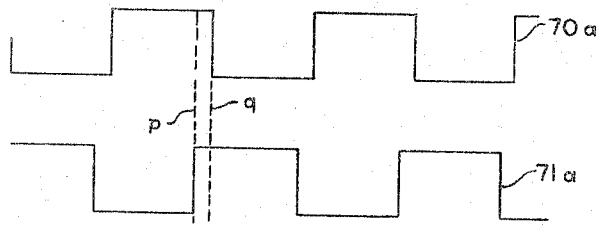
FIG. 4
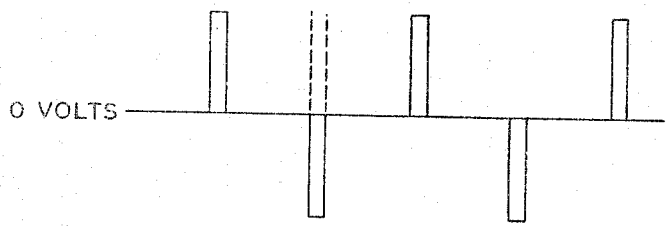
FIG. 5  0 VOLTS

United States Patent Office 3,317,812
Patented May 2, 1967

3,317,812
VOLTAGE REGULATOR CIRCUIT
Lee O. Mesenhimer, Lakewood, Ohio, assignor to Lorain Products Corporation, a corporation of Ohio
Filed Aug. 3, 1962, Ser. No. 214,591
3 Claims. (Cl. 321—16)

This invention relates generally to power supply devices of both the D.-C. output and the A.-C. output class and is directed more particularly to output control means therefor.

In general, the output voltage of such devices may be maintained at a constant value by regulator circuitry incorporated either in the input or the output of the unit. Voltage regulators which control the output voltage of equipment by means of a series element incorporated in the D.-C. input or D.-C. output circuit are generally characterized by a low efficiency.

In D.-C. operated power supplies using transistors to convert the direct to alternating current, it is possible to regulate by means of a transductor connected in the A.-C. power circuit. When such an arrangement is used, the transductor must necessarily be of a size capable of handling the power output of the power transformer. If the output voltage of the device is to be cut off in case of short circuit or other overload condition, the transductor must be of a size capable of handling the full voltage and current of the power supply.

Another disadvantage of some prior structures is the comparatively slow response to regulating signals supplied for the purpose of regulation.

Another object of the invention is to provide pulse width modulation means capable of limiting the current therethrough to a safe level under short circuit conditions.

A still further object of the invention is to provide, in a power supply, a power circuit including a bridge made up of a group of off-on conducting devices and whereupon simultaneous conduction of such devices on each side of the bridge establishes a power path through the bridge together with means for controlling the off-on cycle of said devices to control simultaneity of conduction and magnitude of power through the bridge.

Still another object of the invention is to regulate the overload current of a pulse-width type regulator to proportionately lower the current as the output voltage is reduced so that the peak overload current through the regulator is limited to a substantially constant level.

Another object of the invention is to provide improved circuitry for controlling the pulse width of the output of a power supply.

Another object of the invention is to provide, in apparatus of the above character, improved output regulating circuitry whereby rapid response to any tendency to change in the output is realized to regulate output voltage during normal operation and to reduce the output voltage in the event that the apparatus is subjected to overload conditions.

It is another object of the invention to provide control circuitry of the above character including an ancillary, low power circuit in which the control means is incorporated.

Still another object of the invention is to provide, in a D.-C. operated device, a power circuit section having components controlled from a low power control circuit wherein the controlled operation of the power components varies the power output charactiristic of the device in a predetermined manner.

Still another object of the invention is to provide an improved D.-C. operated device having a power circuit including a plurality of switching means, the coincidence of conduction of said switching means determining the volt-ampere output characteristics of the device, together with an ancillary circuit of relatively low power including means responsive to changes in the output characteristics of the D.-C. operated device for, in turn, controlling the duration of the coincidence of conduction of the switch means to a predetermined degree by introducing a lag in the phase of a controlled alternating current source with respect to the phase of an independent alternating current source.

Another object of the invention is to provide improved circuitry which maintains the output voltage of the D.-C. operated power supply at a constant value while operating at high efficiency.

It is a further object of the invention to provide circuitry of the above character utilizing semi-conductors and more particularly utilizing transistor oscillators, the phase relationship of which may be varied in accordance with changes in output voltage and load current conditions, this variation in phase resulting in precise, highly responsive control of the output.

It is another object of the invention to provide regulating circuitry for a D.-C. operated power supply wherein the arrangement of the circuit components is such that a regulating reactor is present to perform its regulating function and is located in an ancillary circuit wherein it may perform this regulating function while isolated from the normally heavier currents in the power circuit.

It is another object of the invention to provide improved regulating circuitry which is adapted for use with D.-C. operated devices having either A.-C. or D.-C. output.

It is a more specific object of the invention to provide a plurality of transistor oscillators and a transistor power bridge, the coincidence of operation of certain of the transistors in the bridge, and thus the output thereof, being controlled by the phase relationship between the transistor oscillators.

It is another object of the invention to provide means to regulate the output voltage of the power supply by controlling the output voltage of a power bridge by, in turn, controlling the off-on relationship of transistors in a bridge circuit.

A further object of the invention is to provide, in a regulating circuit of the above character having a plurality of A.-C. sources, variable delay means between said sources and means for varying the time delay of said variable delay means in accordance with changes in load demand whereby the phase relationship between said sources is varied in a predetermined manner to, in turn, control the operation of a power bridge in a controlled manner, the latter control being manifested by required changes in the output of the device in which the circuit is utilized.

Another object of the invention is to provide circuitry whereby the frequency of a first A.-C. source which is fed into one side of a transistor power bridge determines the frequency of operation of a second A.-C. source, the output of which is fed into the other side of said power bridge, the phase relationship between the A.-C. sources being varied in accordance with changes in output voltage by output responsive variable delay means connected between the output of the first A.-C. source and the input of the second A.-C. source.

More specifically, it is an object of the invention to provide regulating circuitry for a D.-C. operated device such as a power supply which utilizes a transistor power section of bridge configuration having one set of transistors, the sequence of operation of which is controlled by a first A.-C. source and having another set of transistors, the operation of which is controlled by a second A.-C. source, there being means between the A.-C. sources to vary the phase relationship thereof whereby the coincidence of conduction of the transistors on each side of the bridge is varied in accordance with voltage output of the device so that the voltage output of the bridge is controlled with respect to the output of the device in a compensatory manner.

Other objects and advantages of the invention will be apparent from the following description and accompanying drawings in which:

FIG. 2 shows the wave form of the output of the A.-C. sources to the power bridge and also the phase relationship thereof when the power supply is operating near maximum capacity;

FIG. 3 shows the wave form of the output of the power bridge when the power supply is operating near maximum capacity;

FIG. 4 shows the wave form of the outputs of the alternating current sources and the phase relationship thereof when the power supply is delivering near minimum voltage and FIG. 5 shows the wave form of the output of the power bridge when the power supply is operating near minimum output voltage.

Figure 1:
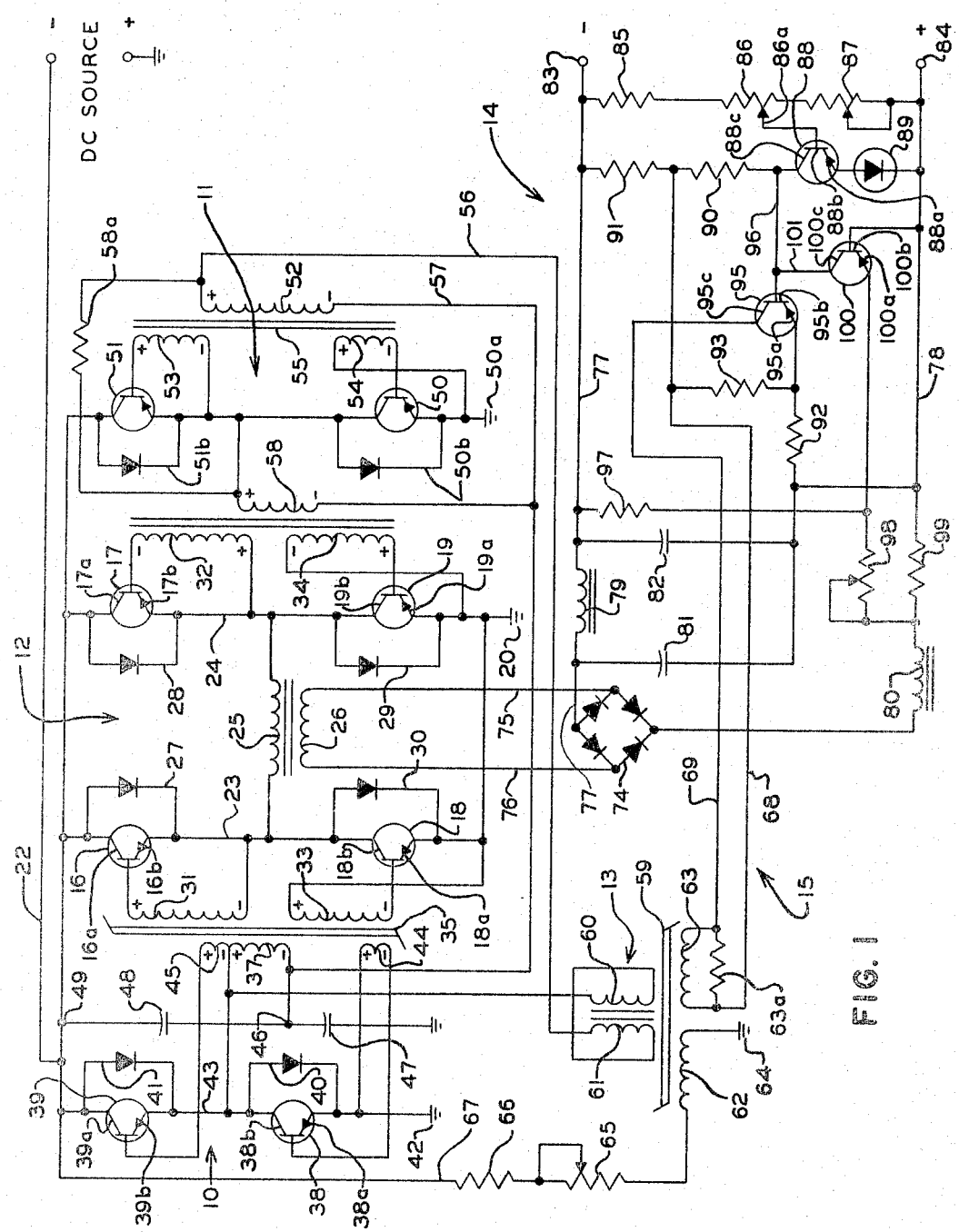
FIG. 1 is a schematic diagram of an exemplary circuit utilizing my invention.

Considering the circuit generally and referring to FIG. 1, it will be seen that there is provided suitable alternating current source means which comprises, in the present embodiment, a master and a slave oscillator 10 and 11 respectively. A power section 12 of bridge configuration made up of a plurality of transistors is also provided and has an output power transformer which serves as load connecting and power output means. There is also provided a variable delay device such as transductor 13 which is connected in a phase control circuit between the alternating current source 10 and the alternating current source 11, the delay of which dictates the phase relationship between alternating current sources 10 and 11. Additionally, there is provided an output voltage regulating control circuit 14 and a rectifier circuit 15.

Considering the power bridge 12 as shown in FIG. 1, this section of the circuit includes P-N-P transistors 16, 17, 18 and 19, each having respective base, emitter and collector electrodes as shown. The emitters, 18a and 19a of transistors 18 and 19 respectively, are connected to ground or positive battery as at 20 while the collectors 16a and 17a of transistors 16 and 17 respectively, are connected to negative battery through leads 21 and 22. The emitters, 16b and 17b of transistors 16 and 17, are connected to collectors 18b and 19b, respectively, of transistors 18 and 19 through leads 23 and 24.

The power bridge 12 is provided with an output transformer which includes primary winding 25 and secondary winding 26, the primary winding being connected across leads 23 and 24 as shown. As will be seen presently, the flow of current through the primary winding 25, which may be considered as load connecting means, is dictated by the sequence of the off-on operation of transistors 16, 17, 18 and 19 and results in an alternating output signal being impressed upon the secondary winding 26 which serves as the power output means of the power supply in a manner also to be described presently.

If desired, diode circuits 27, 28, 29 and 30 are provided between the collectors and emitters of the respective transistors 16, 17, 18 and 19 to bypass any reverse voltage spikes which might occur in the operation of the circuit and thus the transistors are protected from damage.

With the foregoing components, it will be seen that if, for instance, transistors 16 and 19 are biased to conduct simultaneously, there will be current flow from ground 20, through the emitter-collector path of transistor 19, through primary winding 25 of the output transformer, through the emitter-collector path of transistor 16 to the negative power lead 22. On the other hand, if transistors 17 and 18 are biased on simultaneously, current flow will be from ground through the emitter-collector path of transistor 18, through winding 25 in the opposite direction, through the emitter-collector path of transistor 17 to the negative lead. Thus, it will be seen that in the operation of the power bridge, with diagonally opposed transistors having coincidence of conduction of greater or lesser degree, that is, transistors 17 and 18 conducting while transistors 16 and 19 are shut off and then transistors 16 and 19 conducting while transistors 17 and 18 are shut off, there will be impressed upon the winding 25 an alternating signal which comprises the output of the bridge. It will be understood that during periods in which the diagonally disposed transistors are not conducting simultaneously, no voltage will be applied across the load at winding 25. The period during which companion transistors are conducting simultaneously may be considered as the "on" operating period of the power bridge. The "off" operating period, that is when companion transistors are not simultaneously conducting and when either transistors 16 and 17 or transistors 18 and 19 are simultaneously conducting, is that period during which no voltage appears across winding 25. During this period the voltage is clamped at zero value.

From the foregoing explanation of the power bridge 12, it will be seen that the output impressed upon the winding 25 may be varied by a variation in the phase of operation between companion transistors, that is, variation in phase of operation between one side of the power bridge represented by transistors 16 and 18 and the other side thereof represented by transistors 17 and 19. The average output of bridge 12 is proportional to the period of time during which companion transistors, either 17 and 18 are conducting simultaneously. Hence, it will be seen that means which can vary this period of time during which companion transistors have coincidence of conduction will be capable of controlling the output of the bridge.

To the end that the phase relationship between the two sides of the bridge may be controlled in a predetermined manner, each of the transistors 16, 17, 18 and 19 is provided with a base-emitter connected winding as shown at 31, 32, 33 and 34, respectively. Windings 31 and 33 are secondary windings on a saturable core 35, while windings 32 and 34 are secondary windings on a core 36 of an output transformer 36a.

Referring first to the alternating current source 10 shown herein as an oscillator circuit, there is provided a winding 37 which serves as a primary winding for the saturable core 35. An alternating signal is fed to the winding 37 by means of transistors 38 and 39 and is impressed on the secondary windings 31 and 33. Thus it will be seen that the oscillator 10 is operatively coupled to transistors 16 and 18 of the power bridge. Again the transistors may be provided with diode circuits 40 and 41 which serve the same purpose as diode circuits 27, 28, 29 and 30 previously described.

The transistors 38 and 39 are of the P-N-P type. The emitter 38a of transistor 38 is connected to ground as at 42, while the collector 39a of transistor 39 is connected to battery. A lead 43 is provided for connecting the collector 38b of transistor 38 to the emitter 39b of transistor 39. Connections for these transistors are completed by the provision of lead 37a which connects emitter 39b and collector 38b to the upper end of winding 37.

To the end that transistors 38 and 39 will operate in response to periodic saturation of core 35 and thus, reverse the flow of current through primary winding 36, transistors 38 and 39 are provided with base-emitter connecting feedback circuits 44 and 45, respectively.

When the converter is turned on, one or the other of transistors 38 or 39 will start due to the inherent differences in the characteristics thereof. Assuming transistor 38 starts conducting, current will flow from ground through the emitter 38a and collector 38b, downwardly through the winding 37 to a junction point 46 which is connected to the lower end of winding 37. Part of the current will flow downwardly, as shown in the drawing, through the capacitor 47 to ground and thence back to the emitter 38a. The other portion of the current will flow upwardly, as shown in the drawing, through capacitor 48, through the lead 22 to battery, through ground back to the emitter 38a. This condition prevails until the core 35 becomes saturated whereupon the polarity of feedback coils 44 and 45 reverses to shut off transistor 38 and render transistor 39 conducting. Under these circumstances, current flows from junction point 46 upwardly through winding 37, through the emitter 39b, collector 39a to the junction point 49. Part of the current then flows through the capacitor 48, back to junction 46 while another portion of the current flows through the lead 22 through battery and ground, then through capacitor 47 to junction point 46.

The oscillator 10 is so arranged as to provide a square wave at the primary winding 37. This signal is impressed upon secondary windings 31 and 33 to energize the side of the power bridge 12 represented by transistors 16 and 18.

From the foregoing, it will be seen that the circuitry described will impart a predetermined sequence of operation to transistors 16 and 18 which is alternate and several.

Circuitry which will impart alternate and several operation to transistors 17 and 19 will now be described.

The alternating current source 11, also shown herein as a two transistor oscillator, including transistors 50 and 51, is controlled by a feedback transformer having a primary coil 52 and secondary coils 53 and 54, all on a core 55. A resistor 58a, connected at one end between transistors 50 and 51 and at the other end to winding 52, as shown, provides positive feedback for the oscillator 11. Again, diode circuits connected between the emitter and base electrodes as at 50b and 51b may be provided.

From FIG. 1 it will be seen that the coil 52 is connected across the primary coil 37 of the alternating current source 10 by means of leads 56 and 57 which serve as phase control connecting means. With this construction it will be seen that potential on coil 37, the signal across which is determined by core 35 and operation of the transistors 38 and 39, will be impressed upon the coil 52 with the result that transistors 50 and 51 follow the action of transistors 38 and 39 in that they operate at the same frequency as transistors 38 and 39 and operate in phase therewith, assuming theoretically, that no material impedance exists in the connections between coils 37 and 52. As will be seen presently, however, a variable delay device together with leads 56 and 57 is utilized between coils 37 and 52 as a phase control circuit to provide the output voltage regulation afforded by this invention.

Assuming transistor 38 in the alternating source 10 to be conducting, and again, for purposes of description, assuming no impedance between sources 10 and 11, the lower ends of coils 37, 44 and 45 will be of negative polarity. Thus, the lower ends of coils 31 and 33 likewise will be of negative polarity, rendering transistor 18 of the power bridge conducting and transistor 16 thereof non-conducting. At this time the polarity of coil 52 will be negative at its lower end. Similarly, the lower ends of coils 53 and 54 will be of negative polarity whereby transistor 50 will be rendered conducting and transistor 51 will be cut off.

With transistor 50 conducting, emitter-collector current flow thereto will be in a downward direction in FIG. 1 through coil 58 which serves as the primary coil on core 36. Thereafter, the current flow is the same as that described in conjunction with current flow through transistor 38 except that current return is to transistor 50 as at ground 50a rather than to transistor 38. Secondary coils 32 and 34 on the core 36, in the present embodiment of the invention, are wound oppositely to coil 58 and coils 31 and 33 with the result that under the instantaneous condition here assumed, the upper ends of coils 32 and 34 will be rendered negative while the lower ends thereof will have positive polarity. Thus transistor 17 will be driven to a conducting condition and transistor 19 will be rendered non-conducting, since they are operatively coupled to the alternating current source 11.

Under the foregoing assumed instantaneous condition, therefore, it will be seen that transistors 17 and 18 are rendered conducting while transistors 16 and 19 are cut off. Therefore, current flow through the power bridge is from ground 20 through the emitter-collector path of transistor 18, across coil 25 from left to right, through lead 24 and the emitter-collector path in transistor 17 through leads 21 and 22 to negative battery.

This condition prevails until core 35 becomes saturated whereupon transistor 38 shuts off and transistor 39 is rendered conducting. Still assuming that there is no substantial impedance between sources 10 and 11, this reverses the flow of current through winding 37 and thus winding 52. When reversal occurs, transistor 50 shuts off and transistor 51 is rendered conducting. This reverses the flow of current through coil 58 and the current path at this time is that described above in conjunction with the current path through transistor 39.

With the reversal of current flow through winding 37 and winding 58, transistors 16 and 18 switch to render transistor 16 conducting and similarly transistors 17 and 19 switch to render transistor 19 conducting. Under these circumstances, current flow from ground to negative battery is through the emitter-collector path of transistors 19 and 16 whereby, current flow in winding 25 is reversed and is from right to left.

As the foregoing cycles are repeated, it will be seen that an alternating power signal is impressed upon winding 25 and thus upon output winding 26 to supply power for the output of the power supply in a manner to be described presently.

From the foregoing it will be seen that during the period in which either transistors 16 and 19 or 17 and 18 are conducting simultaneously, battery voltage will be impressed on winding 25 and thus, a stepped-up ratio thereof on winding 26 in one direction or the other as explained previously. Accordingly, it will be seen that if this period of coincidence of conduction can be varied in length by changing the timing of transistors 17 and 19 with respect to that of transistors 16 and 18, the average voltage impressed upon winding 26 will be varied. Furthermore, if this timing can be varied in a controlled manner in accordance with any tendency to voltage change at the output terminals of the power supply, a compensating variation, to maintain constant output voltage, can be impressed upon winding 26.

This control of phase relationship between transistors 16 and 18 and transistors 17 and 19 may be obtained by the provision of variable delay means connected between the winding 37 of the A.-C. source 10 and the winding 52 of the A.-C. source 11.

In the present embodiment of the invention, this variable delay is provided by means of a small transductor 13.

The transductor 13 utilized in the present embodiment is a three-legged device having a saturable core 59, series connected timing windings 60 and 61, a bias winding 62 and a control winding 63. As will be seen, the timing windings 60 and 61 are connected serially to the lead 56, which connects the upper end of the output winding 37 of oscillator 10 to the upper end of the winding 52 of the oscillator 11. A resistor 63a connected across control winding 63 reduces the residual alternating voltage induced on the control winding 53 from the timing windings 60 and 61.

Bias winding 62 which sets the level of operation of the transductor 13 is connected between ground 64, through variable resistor 65 and fixed resistor 66 through lead 67 to negative battery. The effect of the winding 62 on the transductor may be varied by adjustment of variable resistor 65.

The winding 63, as will be seen presently, may be connected into a suitable voltage regulator control circuit through leads 68 and 69. By means of a voltage regulator control circuit, one form of which is shown herein, the winding 63 may be made responsive to both output voltage and output current.

The square wave signal impressed on the timing windings 60 and 61 of the transductor from the alternating current source 10 saturates the core 59 first in one direction and then the other. This saturation of the core in either direction does not occur immediately upon reversal of polarity across the timing windings, but requires a lapse of time during which the direction of saturation of the core 59 is reversed. It is this lapse of time that delays passage of a signal from winding 37 of oscillator 10 to winding 52 of oscillator 11. This delay is one of the control features of the present invention.

As indicated previously, the relative timing of the cycles of operation of transistors 16 and 18 and transistors 17 and 19 determines the length of time during which one or the other transistor in one of these pairs is simultaneously conducting with one or the other transistor in the other pair, thereby to control the output of the power bridge 12. This timing is controlled by the delay time in the transductor, this delay time, in turn, being determined by current flow through the winding 63.

Thus, the degree of lag in time for transmittal of a signal from the winding 36 to the winding 52 is determined by current in the winding 63.

If the delay time of the transductor 15 is short, the simultaneous conducting period between companion transistors 16 and 19 or 17 and 18 in the power bridge will be relatively long due to the fact that oscillators 10 and 11 and thus, companion transistors in the bridge, will be operating substantially in phase. However, decrease in current flow in the winding 63 which results in an increase in delay in the reversal of the transductor 13, interposes a greater lag in time in the transmittal of the signal from the winding 37 to the winding 52. This results in a lag in the operation of oscillator 11 with respect to oscillator 10 and thus a lag in the initiation of the conducting period of transistors 17 and 19. In other words, oscillator 10 is unaffected by any current flowing through winding 63 and thus, transistors 16 and 18 operate in a substantially stable frequency cycle while transistors 17 and 19 operate in varying phase relationship with respect to the transistors 16 and 18 as determined by current flow in winding 63.

Accordingly, it will be seen that the time during which battery voltage is impressed, in one direction or the other, across the winding 25 will be varied in accordance with the period during which companion transistors in the power bridge 12 are simultaneously conducting. This results in the variation of the output of the bridge 12.

It will therefore be seen that the transductor 13, as controlled by current flow through the winding 63, whatever conditions may cause variation in that current flow, interposes a time lag in the response of winding 52 to a signal from the winding 37 with a resulting time lag being impressed on transistors 17 and 19 to vary the simultaneity of conductance between transistors on each side of the bridge and thus, the time during which substantially battery voltage is impressed upon winding 25 in one direction or the other.

The concept described above is shown clearly in FIGS. 2 and 4. In FIG. 2, which represents oscillator conditions for near maximum output at the winding 26, the square waves generated by oscillators 10 and 11 shown at 70 and 71 respectively evidence substantial coincidence between their conducting periods as shown by verticals $m$ and $n$. This period of time between verticals $m$ and $n$ is, in effect, the "on" operating period of the device. This coincidence of conductance of companion transistors results in a square-wave output pattern at the coil 26 as shown in FIG. 3. The maximum average output of the device is obtained when the square-wave outputs of oscillators 10 and 11 are in substantial coincidence, a condition which occurs when transductor 13 presents negligible delay as previously described.

Considering the other extreme, namely minimum output, FIG. 4 in which the square waves generated by oscillators 10 and 11 are designated as 70a and 71a respectively, shows a near minimum coincidence of conduction between the oscillators. The operating period is defined by the verticals $p$ and $q$. With this operation, the output at winding 26 is that shown in FIG. 5. Here, it will be noted, the output is materially reduced.

If A.-C. output is desired, the voltages shown in FIGS. 3 and 5 may be fed directly to the load. The wave shape shown will be maintained regardless of the character, for example the power factor, of the load because when companion transistors are conducting, the full D.-C. source is across the transformer 25. When coincidence of conduction between companion transistors does not prevail, either transistors 16 and 17 or transistors 18 and 19 are "on." In either case, an effective short circuit is placed across winding 25 so that zero voltage is maintained regardless of the load current which may flow during this period. It will be seen that diodes 27, 28, 29 and 30 seem to bypass current around the power transistors when operation of the circuit would otherwise require reverse current to flow through the transistor.

The output of the D.-C. operated power supply, if D.-C. rather than A.-C. output is desired, may be completed by the provision of a full wave rectifier 74 having A.-C. leads 75 and 76 connected across winding 26 which is the output of the power bridge 12, and D.-C. leads 77 and 78 which represent in this case the output of the unit.

Various expedients for controlling current flow through winding 63 in response to variations in output voltage and load current at the output of the power supply may be utilized. However, in the present embodiment there is shown a transistor voltage regulator well suited for this purpose, it being understood that one of several forms of regulator may be utilized.

In the embodiment of the invention shown herein, a control circuit having the feature of the invention is described in conjunction with a regulating circuit of the type set forth in the application of Henry M. Huge and Louis R. Szabo filed of even date herewith.

To the end that a smooth D.-C. output may be maintained at the output terminals 83 and 84, there is provided a filter network comprising an inductor 79 connected in lead 77, an inductor 80 in lead 78 and associated capacitors 81 and 83 connected as shown in FIG. 1.

A voltage divider network including a resistor 85, a potentiometer 86 and a variable resistor 87 is connected between lead 77 and 78 to provide an adjustable potential on a wiper 86a which is part of potentiometer 86. A transistor 88 having its emitter electrode 88a connected to lead 78 through a zener diode 89 and its collector electrode 88c connected through resistors 90 and 91 to lead 77, is controlled in its conduction by the potential applied to its base 88b from the wiper arm 86a of the voltage divider potentiometer 86.

The zener diode 89 maintains the emitter electrode 88a of transistor 88 at a constant potential so that a change in the voltage between teminals 83 and 84 will be reflected as a change in emitter-base voltage of transistor 88. Thus, an increase of voltage between output terminals 83 and 84 will result in increased conduction of transistor 88 while a decrease in the voltage between output terminals 83 and 84 will reduce the current flow through that transistor.

Resistors 92 and 93 connected between lead 78 and a common point of resistors 90 and 91 serve, by means of lead 94, to supply proper bias to the emitter electrode 95a of transistor 95. The collector electrode 95c of transistors 95 is connected by means of lead 69 to control winding 63 thus providing a current path from positive potential at lead 78 through resistor 92, through the emitter-collector path of transistor 95, lead 69, the control winding 63 and lead 68, through resistor 91 to negative potential on lead 77. Any tendency of the output voltage to vary will affect the conduction of transistor 88 and, therefore, the potential applied to the base 95b of transistor 95 which is connected by lead 96 to the collector electrode 88c of transistor 88. As the voltage on the base 95b of transistor 95 varies, the current through control winding 63 will be modified thereby changing the delay time of the transductor 13 appropriately to establish a phase relationship between the oscillators 10 and 11 such that output voltage at terminals 83 and 84 is maintained substantially constant.

If, for example, the output voltage between output terminals 83 and 84 rises slightly, transistor 88 will increase in conduction since the base electrode 88b is connected to the potentiometer 86. Emitter electrode 88c will then become less negative with respect to the output terminal 84. This action causes the base electrode 95b of transistor 95 to become less negative with respect to the positive output terminal 84 and thus, the conduction of transistor 95 decreases resulting in a decreased current flow through the control winding 63. The increased delay of the transductor 13 resulting from the lower current in control winding 63 decreases the coincidence of conduction of companion transistors in the power section 12 thereby minimizing the increase of output voltage.

Additionally, circuitry is provided to protect the power supply from overload conditions. This circuit includes a voltage divider consisting of resistors 97 and 98 which are connected between leads 77 and 78, a resistor 99 in the lead 78 between inductor 80 and the output terminal 84, together with a transistor 100. The collector 100c of transistor 100 is connected by means of a lead 101 to the base 95b of transistor 95. The emitter 100a of transistor 100 is connected between resistors 97 and 98 to establish proper bias while the base 100b is connected to output terminal 84 whereby, when a predetermined value of output current is attained, the voltage across resistor 99, which is in the emitter-base circuit of transistor 100, will be of sufficient magnitude to forward bias transistor 100.

When transistor 100 conducts, due to more than a predetermined value of output current being drawn from the output terminals, current will flow from lead 78 through resistor 98 and the emitter-collector path of transistor 100, through leads 101 and 96, resistor 90 and resistor 91 to the negative terminal 83. Conduction of transistor 100 causes the base electrode 95b of transistor 95 to become increasingly positive, reducing emitter-collector current flow through transistor 95 thereby reducing the current through control winding 63. This results in an increased delay time in the operation of transductor 13 and, therefore, the phase relationship between oscillators 10 and 11 is modified to increase the lag of oscillator 11 with respect to oscillator 10. As phase change occurs, the coincident conducting period of companion transistors in power bridge 12 is reduced. As shown in FIGS. 3 and 5, the resulting change in conducting coincidence of companion transistors reduces the output voltage at winding 26 a sufficient amount to prevent more than the predetermined rated load from being drawn.

From the foregoing it will be seen that if certain conditions occur, such as excessive load or short circuit across the output of the power supply, tend to increase the demand upon the power supply beyond a predetermined, rated output capacity or if conditions occur whereby there is a tendency of output voltage to increase or decrease, these conditions will be reflected in current flow in the control winding 63.

This change in current flow either increases or decreases the delay in the operation of the transductor 13 whereby a change in the phase of operation of oscillator 11 with respect to that of oscillator 10 will, in turn, be reflected in the output of the power bridge 12, and thus of the power supply, by means of a variation in the coincidence of the conduction periods of companion transistors 16 and 19 or 17 and 18. Accordingly, the invention not only maintains the output voltage of the power supply constant during normal operating conditions but, also insures against detrimental overload of the circuitry.

It will be understood that the embodiments shown herein are for illustrative purposes only and may be changed or modified without departing from the spirit and scope of the invention as set forth in the appended claims.

What I claim is:

1. The combination in a power supply, of a first square-wave generator, a second square-wave generator controlled by said first generator, a power section including a plurality of off-on conducting means comprising a plurality of transistors arranged in bridge configuration, means for operatively coupling said square-wave generators to respective off-on conducting means, the output of said power section being substantially proportional to the coincidence of conduction of said off-on conducting means, load connecting means comprising a transformer having a primary winding connected between said off-on conducting means whereby current passes through said primary winding in one direction when one of said off-on means is conducting and in the opposite direction when another of said off-on means is conducting, a secondary winding, means connecting said secondary winding across the output terminals of the power supply, variable delay means, means for connecting said variable delay means between said first and second square-wave generators to vary the control relationship therebetween thereby to vary the coincidence of conduction of said off-on means and means responsive to variations in load current and output voltage of the power supply to vary the delay introduced by said variable delay means and, in turn, the coincidence of conduction of said off-on conducting means to maintain constant output voltage of said power supply and reduce output voltage under overload conditions.

2. In a power supply, in combination, a power section including load connecting means and off-on conducting means, the voltage output of said load connecting means being substantially proportional to the coincidence of conduction of said off-on conducting means, means for connecting said off-on conducting means symmetrically with respect to said load connecting means, drive means for said power section comprising a first alternating current generator including switching means and a saturable reactor and adapted to be operated from a direct current source and means for operatively coupling said first alternating current generator to one end of said load connecting means through off-on conducting means, a second alternating current generator including switching means, a feedback transformer and an output transformer and adapted to be operative from direct current source, means for operatively coupling said second alternating current generator to the other end of said load connecting means through other off-on conducting means, means for connecting the output of said first generator to said feedback transformer whereby the frequency of said second generator is controlled by the frequency of said first generator, variable delay means in said last named connecting means for varying the lag in the phase of said second generator with respect to the phase of said first generator to control the output of said load connecting means, regulating means responsive to tendency to change in the output of said power supply and means responsive to said regulating means for varying the delay in the variable delay means.

3. In a power supply, first and second alternating current sources, a power bridge section and variable delay means, said first source comprising an oscillator including a saturable core transformer having a primary winding and secondary windings, serially connected capacitive means across the D.-C. input source, first serially connected semi-conductor means across the D.-C. input source, means connecting one end of said primary winding between said serially connected capacitive means, means connecting the other end of said primary winding between said first serially connected semi-conductor means whereby current is directed alternately in opposite directions through said primary winding; said second alternating current source comprising an oscillator including a feedback transformer having a primary winding and secondary windings, an output transformer having a primary winding and secondary windings, and second serially connected semi-conductor means across the D.-C. input source, means connecting one end of said primary winding of said output transformer between said second serially connected semi-conductor means, means connecting the other end of said primary winding of said output transformer between said serially connected capacitive means; phase control connecting means for connecting the primary winding of said feedback transformer with the primary winding of said saturable core transformer whereby current is directed alternately in opposite directions through the primary winding of said output transformer in response to potential impressed on said second semi-conductor means by said secondary windings of said feedback transformer from said primary winding of said feedback transformer as controlled by the primary winding of said saturable core transformer; said power bridge section including load connecting means, off-on conducting means, the voltage delivered to said load connecting means being proportional to the coincidence of conduction of said off-on conducting means, means for connecting one side of said power bridge section to said secondary windings of said saturable core transformer, means for connecting the other side of said power bridge to the secondary windings of said output transformer whereby the coincidence of conduction of said off-on conducting means is determined by the phase relationship of said first and second alternating current sources; variable delay means connected in said phase control connecting means to vary the phase relationship of said first and second alternating current sources and control means for said variable delay means, said control means being responsive to the output of the power supply.

References Cited by the Examiner

UNITED STATES PATENTS

| | | | |
|---|---|---|---|
| 2,575,600 | 11/1951 | Smith | 321—5 |
| 2,972,710 | 2/1961 | D'Amico | 321—45 X |
| 3,010,062 | 11/1961 | Van Emden | 321—18 |
| 3,074,030 | 1/1963 | Hierholzer | 321—45 X |
| 3,109,133 | 10/1963 | Mills | 321—45 X |
| 3,118,105 | 1/1964 | Relation et al. | 321—45 |
| 3,175,160 | 3/1965 | Pintell | 307—88.5 |
| 3,189,813 | 6/1965 | Frierdich | 321—45 |
| 3,205,424 | 9/1965 | Bates | 321—18 |
| 3,247,447 | 4/1966 | Flairty | 321—14 |

JOHN F. COUCH, *Primary Examiner.*

L. McCOLLUM, *Examiner.*

J. M. THOMSON, M. L. WACHTELL,
*Assistant Examiners.*